Patented Aug. 2, 1949

2,477,612

UNITED STATES PATENT OFFICE 2,477,612

VINYLIDENE CHLORIDE-VINYL CHLORIDE COPOLYMER COMPOSITION FOR MAKING SHRINKABLE, TRANSLUCENT FILMS

Carroll R. Irons, Midland, Mich., assignor to The Dow Chemical Company, Midland, Mich., a corporation of Delaware No Drawing. Application June 28, 1948, Serial No. 35,734

4 Claims. (Cl. 18—57)

This invention relates to a specific composition consisting of a particular vinylidene chloride-vinyl chloride copolymer and small amounts of certain modifying agents therefor. It relates in particular to such a composition capable of being extruded and stretched in normal manner to produce translucent, odorless films which are not discolored by the heat of extrusion, which do not exude their contained modifying agents, have high flexibility at low temperatures, are adapted particularly for packaging foods to be frozen, and are capable of from 30 to 50 per cent shrinkage when heated to temperatures from 85° to 100° C.

Within the past few years the copolymers of vinylidene chloride and vinyl chloride have become industrially important. Some of them are unique by virtue of their now well-known crystalline character. This property permits the formation of strong, flexible films by a process of extrusion, supercooling, and controlled pneumatic stretching, such as is described, for example, by W. T. Stephenson in copending application Serial No. 721,738, filed January 13, 1947, now U. S. Patent No. 2,452,080. Of the various crystalline copolymers of vinylidene chloride and vinyl chloride, those containing from 70 to 77 per cent vinylidene chloride and correspondingly from 30 to 23 per cent vinyl chloride are capable of the greatest amount of shrinkage when exposed to such moderate temperatures as 85° to 100° C. This narrow range of copolymer compositions, accordingly, is useful for the packaging of foodstuffs by the method described by G. V. Moore and the present applicant in copending application Serial No. 788,973, filed November 29, 1947. The method claimed in said application comprises providing a flexible bag made of a film of the copolymer of 70 to 77 per cent vinylidene chloride, balance vinyl chloride, enclosing the foodstuff in the bag and heating the assembly to a temperature from 85° to 100° C. to cause the bag to shrink into contact with its contents. It has been found that copolymers containing more than 77 per cent vinylidene chloride are too highly crystalline and hence do not shrink sufficiently at moderate temperatures for use in the above-described process. Similarly, copolymers containing less than 70 per cent vinylidene chloride, balance vinyl chloride, are almost entirely amorphous and do not have the required mechanical properties.

The copolymer of from 70 to 77 per cent vinylidene chloride, balance vinyl chloride, may be extruded readily when properly modified, but becomes discolored during exposure to high temperatures in the extrusion zone unless a modifying agent is present to serve as a plasticizer and to depress the softening point and increase the thermal stability of the polymer during fabrication. Since films to be used in contact with foodstuffs should not be discolored and should not impart any foreign odor or flavor to the foods, considerable care must be exercised in the selection of modifiers for use in connection with the copolymer.

It has been found that very few of the common "plasticizers" are of any assistance in extrusion of the identified copolymer, and that when thin extruded articles, such as films, are to be made, there are even fewer operative plasticizers. With many such modifiers the heat of extrusion results in a thermal degradation of the copolymer evidenced by darkening and by evolution of hydrogen chloride. Whether or not such decomposition is noted, the resulting products are often brittle, especially at low temperatures. Most plasticizing modifiers for the present copolymer exude to the surface of films or other thin articles made from it and give the article an undesirably oily surface. This is especially noticeable in the case of stretched thin films and is particularly objectionable in the case of those films intended for use in packaging of foodstuffs. When the objectionable oiliness of such exuded plasticizers is considered together with the distinct and commonly disagreeable odors of the plasticizers, it becomes apparent that the preparation of a composition suitable for use in the exacting field of food packaging requires special care.

It is among the objects of the present invention to provide a composition of matter containing the above-identified copolymer and such modifiers as may be required to extrude the same easily without thermal decomposition, which is capable of being extruded and stretched to form an oriented crystalline thin film which is at least translucent so as to make visible any articles wrapped therein, and is odorless, flexible at low temperatures, does not exude its modifiers on standing, and is capable of shrinking from 30 to 50 per cent when exposed to temperatures in the range from 85° to 100° C.

It has now been found that the foregoing and related objects may be attained by the preparation of a particular composition consisting of at least 88.75 per cent, and preferably about 92 per cent by weight, and not to exceed 95.7 per cent of the copolymer of from 70 to 77 per cent of vinylidene chloride copolymerized with correspondingly from 30 to 23 per cent of vinyl chloride, the balance of the composition consisting of the following modifiers, each within the stated range of proportions, selected so that the total weight of copolymer and modifiers is 100 per cent: (1) from 0.3 to 1.25 per cent of tetrasodium pyrophosphate, (2) from 2 to 6 per cent of dibutyl sebacate and (3) from 2 to 4 per cent of ethyl phthalyl ethyl glycolate. The preferred composition consists of 1 per cent of tetrasodium pyrophosphate, 4 per cent of dibutyl sebacate, 3 per cent of ethyl phthalyl ethyl glycolate, and 92 per cent by weight of the copolymer of 73 per cent vinylidene chloride and 27 per cent vinyl chloride. When less than 0.3 per cent of tetrasodium pyrophosphate is employed, the composition is thermally unstable. When more than 1.25 per cent thereof is used in the present composition extrusion of useful articles is impossible. When more than the stated maximum of the sebacate or of the glycolate are used, exudation occurs from the film. When less than the stated minimum of either plasticizer is employed, the flow viscosity of the composition is so high that extrusion is difficult if not impossible, and the polymer decomposes. The above-defined operative composition is capable of being extruded easily, and thin films produced therefrom by the process of extrusion and cold stretching do not exude the contained modifiers, even after standing for several months, and have no significant odor. Such films remain flexible at temperatures prevalent in frozen food lockers and may be used not only to wrap meats, vegetables and other foods for storage at freezing temperatures but also to wrap cheese, butter and other foods normally stored at higher temperature, without tainting or otherwise adversely affecting the packaged goods so far as can be determined by taste, odor, and appearance of the wrapped foods. The films are particularly useful and advantageous when employed in the shrink-packaging process of the above-identified Moore and Irons application Serial No. 788,973.

The tetrasodium pyrophosphate employed in the compositions is not a plasticizer and does not significantly lower the flow viscosity of the copolymer. When the dibutyl sebacate and the ethyl phthalyl ethyl glycolate are used as modifiers for the copolymer without having tetrasodium pyrophosphate present, extrusion is impossible regardless of the amount of plasticizer employed. When, however, the herein described and recommended combinations of modifiers are used, extrusion is readily effected without decomposition and the products do not exude their plasticizers even when they are fully stretched and oriented and have the least capacity for modifying agents.

In a specific example, a composition was prepared by mixing together in a ball mill 1 per cent by weight of tetrasodium pyrophosphate, 4 per cent of dibutyl sebacate, 3 per cent of ethyl phthalyl ethyl glycolate and 92 per cent of a copolymer made from 72.6 per cent vinylidene chloride and 27.4 per cent vinyl chloride. The resulting composition had a softening point of about 145° C. as compared with a melting point of 148° C. for the unmodfied copolymer. The composition was extruded through a tube-forming orifice 2.5 inches in diameter into a water bath at 20° C. to supercool the tube which was then conducted between 2 pairs of pinch rollers, the second set operating at a peripheral speed 3 times that of the first set. The tube was also distended radially between the 2 sets of rollers by means of a trapped air bubble which increased the tube diameter about 4-fold. The so-stretched crystalline film in tubular form was cut transversely into various lengths and one end of each section of film tube was sealed by flattening the tube and heating the end briefly to 150° C. under moderate pressure. The so-formed pouches showed no evidence of thermal decomposition resulting from the high temperature in the extrusion zone. They had no detectable odor and were found to contribute no taste or odor to food packed therein by the heat shrinking process. The films made from this composition were flexible at temperatures of −40° C. and lower, they exhibited no tendency to exude plasticizer on prolonged standing at room temperature, and, when subjected to a temperature of 85° C. by immersion in hot water, were found to shrink about 45 to 50 per cent.

I claim:

1. A composition of matter consisting of (A) from 88.75 to 95.7 per cent by weight of the copolymer of from 70 to 77 per cent of vinylidene chloride copolymerized with correspondingly from 30 to 23 per cent of vinyl chloride, and (B) correspondingly from 11.25 to 4.3 per cent in the aggregate of the following modifiers, each within the stated range of proportions: (1) from 0.3 to 1.75 per cent of tetrasodium pyrophosphate, (2) from 2 to 6 per cent of dibutyl sebacate, and (3) from 2 to 4 per cent of ethyl phthalyl ethyl glycolate.

2. A composition of matter consisting of 92 per cent of the copolymer of 73 per cent vinylidene chloride and 27 per cent vinyl chloride, 1 per cent of tetrasodium pyrophosphate, 4 per cent of dibutyl sebacate, and 3 per cent of ethyl phthalyl ethyl glycolate.

3. A translucent odorless oriented crystalline film which is free from tendency to exude its contained modifiers, is flexible at −40° C. and is composed of the composition claimed in claim 1.

4. A translucent odorless oriented crystalline film which is free from tendency to exude its contained modifiers, is flexible at −40° C. and is composed of the composition claimed in claim 2.

CARROLL R. IRONS.

No references cited.